O. A. STRANAHAN.
INTERNAL COMBUSTION ENGINE.
APPLICATION FILED JAN. 6, 1909.

959,084.

Patented May 24, 1910.
3 SHEETS—SHEET 1.

Witnesses:
Howard Hanscom
Nathan C. Lombard

Inventor:
Olin A. Stranahan,
by Walter E. Lombard,
Atty.

O. A. STRANAHAN.
INTERNAL COMBUSTION ENGINE.
APPLICATION FILED JAN. 6, 1909.

959,084.

Patented May 24, 1910.

3 SHEETS—SHEET 3.

Witnesses:
Howard Hanscom
Nathan C. Lombard

Inventor:
Olin A. Stranahan,
by Walter E. Lombard,
Atty.

UNITED STATES PATENT OFFICE.

OLIN A. STRANAHAN, OF NEW YORK, N. Y.

INTERNAL-COMBUSTION ENGINE.

959,084.   Specification of Letters Patent.   Patented May 24, 1910.

Application filed January 6, 1909. Serial No. 471,012.

*To all whom it may concern:*

Be it known that I, OLIN A. STRANAHAN, a citizen of the United States of America, and a resident of New York, in the county and State of New York, have invented certain new and useful Improvements in Internal-Combustion Engines, of which the following is a specification.

This invention relates to internal combustion engines and has for its object the provision of a means whereby a greater amount of combustible mixture may be admitted to the cylinders than by the usual methods, thereby increasing its capacity to take care of overloads and thus giving the internal combustion engine as varied a range as have other prime movers such as steam engines, etc. This is effected partially by admitting the combustible mixture while under pressure through the compression chamber at the beginning of the suction stroke of the piston and partly by adding thereto, after the primary inlet has been closed, at or near the end of the suction stroke of the piston an additional amount of combustible mixture under the same pressure or a higher pressure or an additional amount of air under the same pressure or a higher pressure to complete the necessary combustible mixture.

The invention further consists in providing mechanism whereby the fuel mixture and air may be admitted to the compression chamber at two different points in the travel of the piston, either under atmospheric pressure or under compression, together with means for regulating the amount of air or gas admitted to the cylinder at either of these points.

The invention further consists in controlling the admission of gas or air at the secondary inlet by means of the engine governor.

The invention further consists in certain novel features of construction and arrangement of parts which will be readily understood by reference to the description of the drawings and to the claims hereinafter given.

Figure 1:
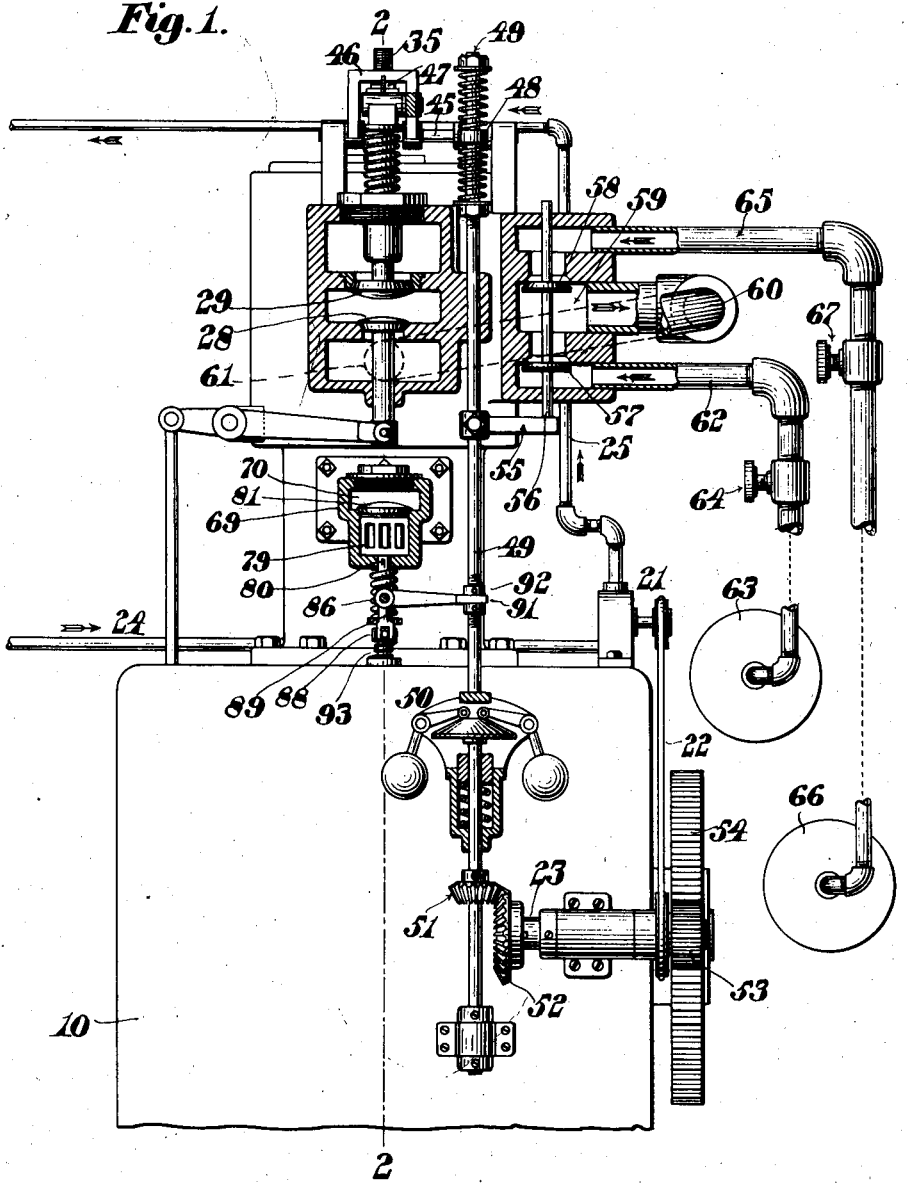
Figure 2:
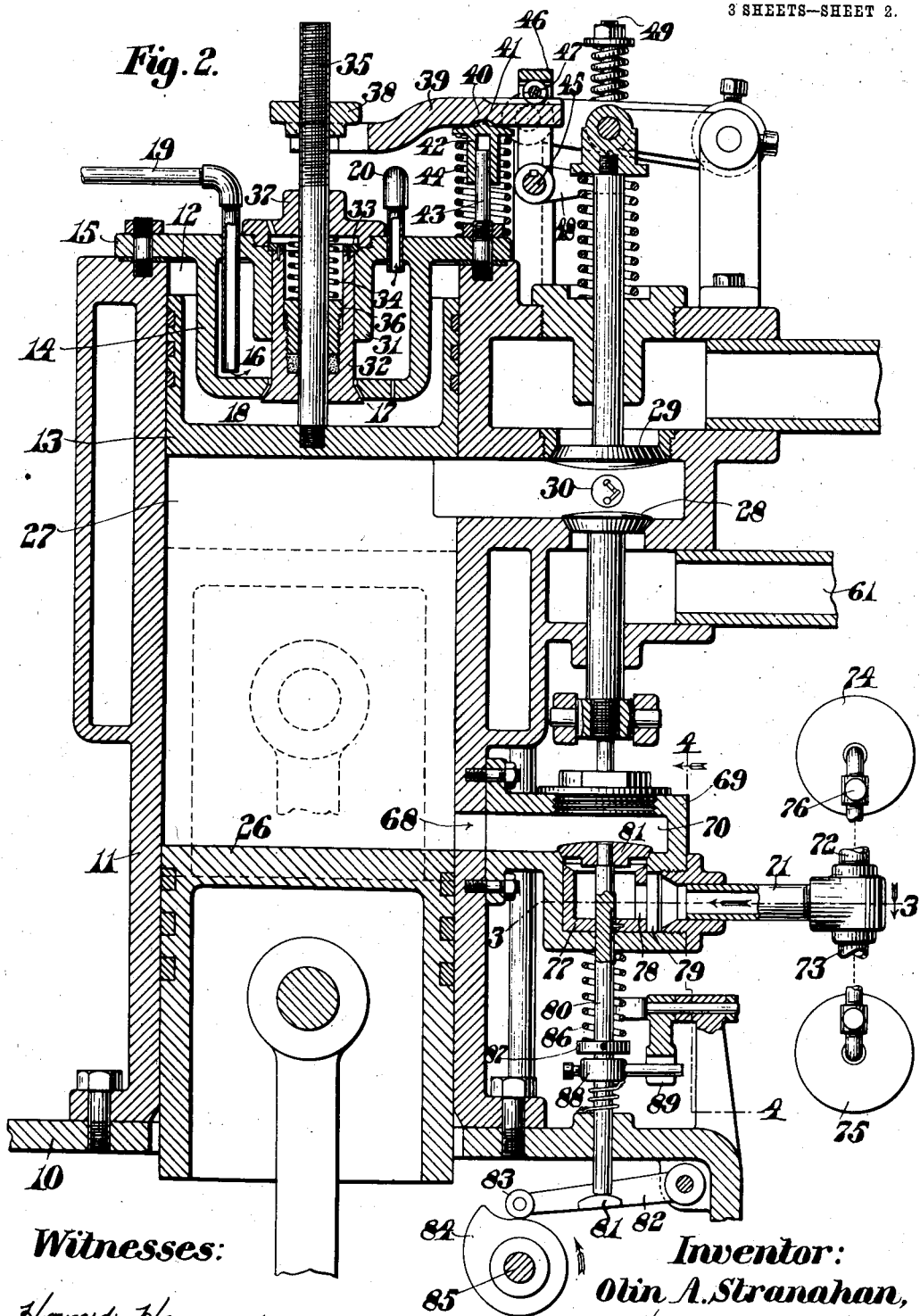
Figure 3:
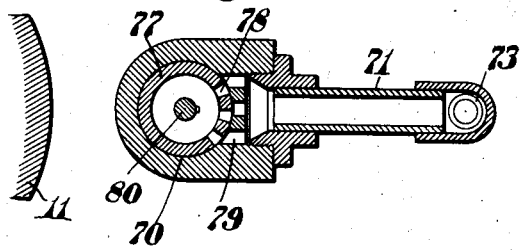
Figure 4:
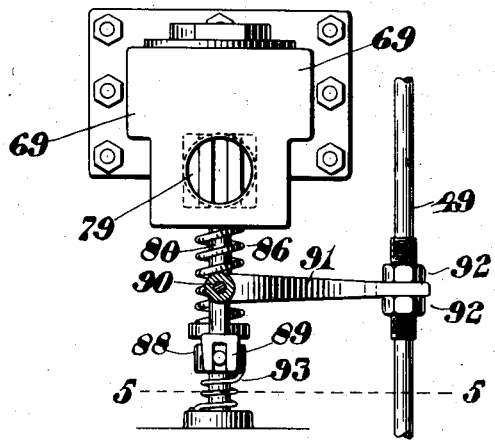
Figure 5:
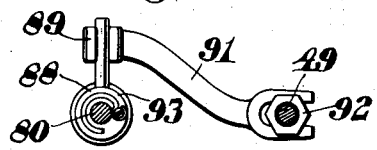
Figure 6:
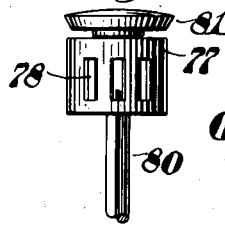

Of the drawings: Figure 1 represents an elevation of the upper part of an internal combustion engine, the admission valves being shown in section. Fig. 2 represents an enlarged vertical section of the upper part of said engine, the cutting plane being on line 2—2 on Fig. 1. Fig. 3 represents a horizontal section through the auxiliary inlet valve, the cutting plane being on line 3—3 on Fig. 2. Fig. 4 represents a vertical section of the auxiliary valve, the cutting plane being on line 4—4 on Fig. 2. Fig. 5 represents an inverted horizontal section of the same, the cutting plane being on line 5—5 of Fig. 4. Fig. 6 represents an elevation of the auxiliary valve.

Similar characters designate like parts throughout the several figures of the drawings.

In the drawings, 10 represents the usual crank chamber casing of an internal combustion engine having mounted therein the cylinder 11, the upper end of which is provided with an opening 12 to which is fitted the movable member 13. This movable member is cup-shaped, as shown in Fig. 2, and the bowl thereof is partially filled by means of the chambered extension 14 formed on a closure 15 secured to the cylinder 11 in any well-known manner. This extension 14 is provided with an inclosed chamber 16 communicating by means of the passage or opening 17 with the space 18 between the outer surface of said extension 14 and the interior of said cup-shaped movable member 13.

A suitable fluid is admitted through the pipe 19 to the chamber 16 and an outlet pipe 20 extends from said chamber 16 to any suitable point. The fluid entering the chamber 16 through the pipe 19 is caused to constantly circulate in the chamber under suitable pressure by means of the pump 21 which may be driven by means of the belt 22 from the shaft 23, or said pump may be driven in any other well-known manner.

The fluid is admitted to the pump 21 through the pipe 24 and is forced through the pipe 25 to the pipe 19. Within the cylinder 11 is the usual reciprocating piston 26 which is shown in Fig. 2 in full lines at the end of the suction stroke, and in dotted lines at the upper end of its compression stroke, leaving a compression space 27 between the end thereof and the inner end of the movable member 13. The inlet valve 28 is adapted to admit an explosive mixture to said compression chamber in any well-known manner, while the valve 29 of any well-known construction and operable in any well-known manner, regulates the exhaust therefrom.

The spark plug 30 is of any well-known construction and operates in the usual manner. Within the chamber 16 extends the boss 31 formed upon the inner face of the closure 15, this boss forming a bearing for the reciprocating valve 32 which extends through the passage 17 and is adapted to close said passage under certain conditions which will be hereinafter stated.

The upper end of the valve 32 is provided with an outwardly extending flange 33 which co-acts with a shoulder formed in the boss 31 to limit the downward movement of said valve 32. A spring 34 within the interior chamber of said valve 32 and surrounding the stem 35 of the movable member 13 normally retains said valve in open position. The tension of this spring 34 may be regulated by means of the threaded plug 36 of a suitable stuffing box in an obvious manner.

The opening through the closure 15 and boss or hub 31 is closed by the member 37 which forms a bearing for the stem 35 in which bearing said stem is adapted to be reciprocated. This stem 35 has threaded thereto the nut 38 which may be adjusted longitudinally of the stem 35 to limit the movement of the member 13 in one direction in case of accident by coming in contact with the end of the bearing 37 while the movement of the member 13 in the other direction is limited by means of the upper end thereof coming in contact with the inner face of the closure 15.

Co-acting with the nut 38 is a forked lever 39 having intermediate its end a detent 40 into which extends a fulcrum 41 formed upon a sleeve 42 mounted upon a support 43 secured to the upper end of the cylinder 11. The sleeve 42 is provided with a suitable flange between which and the closure 15 is interposed a spring 44. In suitable bearings formed upon the cylinder 11 is a rocker shaft 45 to which is rigidly secured a slotted member 46 through the slot in which extends the outer end of the lever 39. Interposed between the upper end of said slot 46 and the upper face of the lever 39 is an antifriction roller 47 provided with a central flange extending into grooves in said rocker member 46 and lever 39, said flange serving to maintain said roller at all times transverse to the length of said lever 39.

Secured to the rocker shaft 46 is an arm 48, the outer end of which is provided with an opening therethrough through which extends a vertical rod 49 forming a part of the governor 50 of any well-known construction, driven by means of a beveled pinion 51 meshing with a beveled gear 52 on the shaft 23. This shaft 23 has mounted thereon a pinion 53 meshing with a gear 54 keyed to and revoluble with the crankshaft of the engine.

The rod 49 has secured thereon an arm 55 supporting a valve stem 56 on which is formed the valve 57 and 58 adapted, respectively, to control the admission of air and gas to the mixing chamber 59 from which the explosive mixture passes through the pipe 60 to the inlet passage 61 in the cylinder 11. From this passage 61 the explosive mixture is adapted to be admitted to the compression space whenever the valve 28 is opened in the usual operation of the engine. When the rocker arm 46 is in its normal position, as indicated in Fig. 2, the tension of the spring 44 is sufficient to substantially balance the movable member 13, the pressure of the circulating medium against said movable member, and the suction in the compression space 27 when the valve 32 is open.

It is obvious that if any part of the load is suddenly thrown off the governor 50 will act to move the rod 49 upwardly thereby admitting a smaller amount of explosive mixture to the cylinder 11. When a less amount of explosive mixture is thus admitted to the cylinder, it is quite obvious that in order to secure a constant compression, it is essential that the volume of the compression space in said cylinder should be reduced simultaneously with the reduction in the amount of mixture being admitted to the cylinder. This is accomplished through the medium of the arm 39 which is raised by the rod 49 moving the rocker member 46 toward the fulcrum 41. This change in leverage of the lever 39 causes the pressure in the space 18 to exceed the tension of the spring 34 and thereby permits the spring 44 to be compressed and more of the circulating fluid to be admitted from the chamber 16 into the space 18 and move the member 13 downwardly into the compression space 27, and thereby reduce the volume therein.

It is obvious that the proportion of the compression space displaced by the movable member 13 will be in proportion to the distance of movement of the roller 47 toward the fulcrum 41. When an additional load is placed upon the engine, it is obvious that the governor will act to cause the rod 44 to be lowered and in so doing the rocker member 46 will be moved away from the fulcrum 41. This movement will so change the leverage of the lever 39 that the tension of the spring 44 will exceed the pressure upon the member 13 and permit said spring to so act upon the lever 39 that the member 13 will be moved upwardly.

It is obvious that the movement of the member 13 will be in proportion to the distance that the roller 47 moves away from the fulcrum 41. To allow the outward movement of the member 13 and thereby increase the volume of the compression space for increased loads, the spring 34 has sufficient tension to hold the valve 32 in its open position against the pressure upon its face due to the pressure of the fluid in the space 18 created by the tension of the spring 44.

The mechanism hereinbefore described is substantially the same and operates in substantially the same manner as that shown and described in another application of mine, filed Mar. 9, 1908, Ser. No. 420,505.

In order to secure a greater efficiency in an engine constructed as has been hereinbefore described, it is desirable that means should be provided whereby the gaseous fuel and air admitted to the compression chamber may be so admitted under compression, and in order to accomplish this result the air inlet pipe 62 leads to a suitable compressor 63 and is provided with a regulating valve 64 by which the amount of air passing to the compression chamber through the valve 57 may be regulated. In like manner the pipe 65 for the gaseous fuel leads to a suitable compressor 66 and has therein a valve 67 by which the amount of gaseous fuel supplied to the cylinder may be regulated. It is obvious therefore that both the air and gaseous fuel admitted to the compression chamber at the commencement of the suction stroke may be introduced into said compression chamber under compression and the proportional amounts of air and gaseous fuel thus admitted may be regulated by the valves 64 and 67. Where the combustible mixture is thus admitted under compression it is obvious that it will occupy less space or in other words in a given compression space a greater amount of combustible mixture may be admitted, thus greatly increasing the efficiency of the engine by securing a greater horsepower without subjecting the cylinder to increased strain. It has been found that the efficiency of the engine may be still further greatly increased by supplying at or near the end of the suction stroke an additional quantity of combustible mixture or air under the same compression that the air and gas is supplied to the compression space through the pipe 62 and 65 or under a greater degree of compression. In order to effect this admission of the additional supply of gaseous fuel or air through this auxiliary inlet 68, a casing 69 is provided having a chamber 70 communicating with the inlet 68 and an inlet pipe 71 communicating with the interior of this casing, said inlet pipe 71 being provided with branches 72 and 73 leading, respectively, to an air compressor 74 and gas compressor 75, each of the pipes 72 and 73 being provided with a valve 76 by which the amount of air or gas admitted to the inlet pipe 71 from the compressor tanks 74 and 75 may be regulated as desired.

The chamber 70 has a semi-cylindrical extension to which is fitted the cup-shaped slotted valve 77, the slots 78 of which are adapted to register with the ports 79 in a partition interposed between said member 77 and the inner end of the inlet pipe 71. The member 77 is splined to a valve stem 80 to the upper end of which is secured a reciprocating valve 81 which normally closes the extension of the chamber 70 in which said cup-shaped member 77 is adapted to revolve. The lower end of the valve stem 80 bears upon a lug 81 formed upon the side of a pivoted lever 82, the outer end of which carries a roller 83 engaging with a cam 84 upon a revoluble shaft 85, said shaft 85 being timed to make one complete revolution during two reciprocations of the piston.

The piston 26 during its reciprocation covers the inlet 68 to the chamber except when it has nearly reached the end of its suction and explosion strokes when it begins to uncover said inlet, which remains uncovered until the piston has traveled a short distance on its return stroke, when it again covers the inlet and prevents the combustible mixture or air contained within the chamber 70 from passing into the cylinder 11. When the cam 84 acts upon the roller 83 on the lever 82 the valve 81 is lifted from its seat and the combustible or air passing through the inlet pipe 71 is free to pass through the ports 79 and 78 into the chamber 70 and if the port 68 is uncovered at that time, this material passing through the valve 81 will be free to enter the chamber 11 and mix with the combustible and air admitted to the compression space through the valves 28 at the commencement of the suction stroke of the piston 26. It is obvious that the reciprocation of the valve 81 is always uniform, depending upon the lifting of the cam 84. Normally the valve 81 is retained to its seat by the spring 86 acting upon a collar 87 secured to the valve stem 80.

In order to regulate the additional supply of combustible or air under compression through the auxiliary inlet 68 under various conditions of load the valve stem 80 has secured thereto an arm 88 with which the forked lever 89 engages. This lever 89 is pivoted at 90, as shown in Figs. 2 and 4, and has an arm 91 interposed between two nuts 92 adjustably mounted upon the rod 49 of the governor. A spring 93 retains said cam 91 in its normal position and returns it to this normal position when moved therefrom. It is obvious that any reciprocation of this rod 49 will cause a rocking of the bell crank lever 89—91 and thereby rotate the valve stem 80 and the cup-shaped member 77. This rotation of the cup-shaped member 77 will cause the ports 78 to be moved out of register with the ports 79 in the casing partition, thereby restricting the flow of combustible or air under compression from the inlet valve 71 to the chamber 70.

It is obvious that with an internal combustion engine, the practical limiting condition which prevents over-loads corresponding to other prime movers, such as steam engines, etc., is that a sufficient amount of combustible mixture can not be admitted to the cylinders by usual methods. For instance, in a four cycle engine, the combustible and proper amount of air for complete combustion are usually admitted during the suction stroke at practically atmospheric pressure and with suction producer gas at even less than atmospheric pressure, thus limiting the amount, whereas if they were admitted under pressure the quantity could be increased as also the power produced. Furthermore the explosive pressure which regulates the necessary strength of engine parts would not be increased, if the compression remain the same, by introducing more combustible mixture, so that the same engine can produce increased power without increasing maximum strains, the additional power being due to a higher mean effective pressure. This can be accomplished by compressing both the combustible and air before admittance which will require sufficient compressor capacity for the total amount used, and this is one of the objects of this invention.

Another object of this invention is to provide a means such as has been shown and described by which the combustible and sufficient air for ignition but not for complete combustion may be admitted in the usual way, at atmospheric pressure or suction, and then near the close of the suction stroke, after the inlet valve is closed, a sufficient amount of additional air under suitable pressure for complete combustion. The compression can be done by an independent compressor (which may or may not be driven by the engine) or in certain designs of engines by the piston upon its back stroke. This method of regulation and increased maximum power can be accomplished by means of the mechanism described, the auxiliary inlet 68 of which will be covered by the piston 26 except at and near its position at the end of the explosion and suction strokes. The valve 81 may be opened at near the end of the suction stroke to admit compressed air or gas to mix with the combustible mixture and closed just after the beginning of the compression stroke, or it may also be opened at the end of the explosion stroke of the piston to admit compressed air to assist the expulsion of burned gases.

It is obvious that the amount of valve opening or area of air passage may be controlled by the engine governor 50 by the mechanism hereinbefore described. The operation would be that instead of adjusting the mixing valves for the proportion of air to give complete combustion as usual, they would be adjusted for less than the amount sufficient for complete combustion. The rest of the necessary air would be admitted through the auxiliary air valve 81 near the end of the suction stroke. The engine governor will regulate the amount of gas and air admitted through the mixing valves and the amount of air admitted through the auxiliary air valves according to the load upon the engine, so that when adjusted the action will be automatic from light load to at least 50% above rated load.

The auxiliary valve port is usually more or less open at all loads, although if known that the load for a certain period would not exceed normal the secondary valve could be thrown out of commission by closing the valves and the mixing valve adjusted to admit the proper amount of air for combustion. In this case the mixing valve would be set for proper amount of air for combustion and the port of secondary valve remain closed until the position of governor at overload would open it, and continue to open it wider as load increased. Both compressed gas and air would be admitted to give an additional amount of combustible mixture, it being obvious that the gas and air could be compressed and admitted together or separately through separate valves. In some cases the mixing valve of the engine may be so set that sufficient air for complete combustion will be admitted with the gas under atmospheric pressure (or suction) and then an additional amount of air and combustible under compression, according to load would be admitted through the secondary valve. The automatic regulation of the compression space according to load, by means of the member 13 and its operating mechanism makes it possible to effect the result desired and by the use of the present invention good economy at light loads are possible while large over-loads upon a gas engine which are now impossible would be possible with an engine constructed as herein described.

It is believed that from the foregoing the operation and many advantages of the invention will be fully understood without further description.

Having thus described my invention, I claim:

1. In an internal combustion engine, the combination with a reciprocating piston; of means for supplying a combustible and air to the compression chamber during the suction stroke of said piston; means for regulating the compression during the compression stroke; and means co-acting with said compression regulating means for supplying and regulating the admission of an additional amount of air at the end of said suction stroke.

2. In an internal combustion engine, the combination with a reciprocating piston; of means for supplying a combustible to the compression chamber during the suction stroke of said piston; and means for regulating the admission of a supply of air at the end of said suction stroke and the amount of compression produced during the compression stroke in relation to the amount of air supplied.

3. In an internal combustion engine, the combination with a reciprocating piston; of means for supplying a combustible to the compression chamber during the suction stroke of said piston; and means for supplying and so regulating the admission of an amount of air at the end of said suction stroke, and the volume of the compression space that the compression during the compression stroke will be inversely proportional to the amount of air supplied.

4. In an internal combustion engine, the combination with a reciprocating piston; of means for supplying a gaseous mixture to the compression chamber at the commencement of the suction stroke of said piston; an inlet to the cylinder at a point in advance of the position of said piston at the commencement of the compression stroke; a combined reciprocating and revoluble slotted valve for said inlet; means for reciprocating said valve at a predetermined time; and means for rotating said valve by the engine governor to uncover the slots in said valve sufficiently to regulate the amount of gas admitted therethrough.

5. In an internal combustion engine, the combination with a reciprocating piston; of means for supplying a gaseous mixture to the compression chamber at the commencement of the suction stroke of said piston; an inlet to the cylinder at a point in advance of the position of said piston at the commencement of the compression stroke; a combined reciprocating and revoluble valve for said inlet; means for reciprocating said valve at a predetermined time; a cup-shaped slotted member secured to the stem of said valve; and means controlled by the governor for rotating said cup-shaped slotted member to uncover said slots sufficiently to regulate the amount of gas admitted therethrough.

6. In an internal combustion engine, the combination with a reciprocating piston; of means for supplying a gaseous mixture to the compression chamber at the commencement of the suction stroke of said piston; an inlet to the cylinder at a point in advance of the position of said piston at the commencement of the compression stroke; a combined reciprocating and revoluble valve; means for opening said valve at a predetermined time; a cup-shaped slotted member secured to the stem of said valve, the slots of which co-act with ports in the valve casing; and means for rotating said cup-shaped member to regulate the supply through said ports.

7. In an internal combustion engine, the combination with a reciprocating piston; of means for supplying a gaseous mixture to the compression chamber at the commencement of the suction stroke of said piston; an inlet to the cylinder at a point in advance of the position of said piston at the commencement of the compression stroke; a combined reciprocating and revoluble valve; means for opening said valve at a predetermined time; a cup-shaped slotted member secured to the stem of said valve, the slots of which co-act with ports in the valve casing; and means controlled by the governor for rotating said cup-shaped member to regulate the supply through said ports.

8. In an internal combustion engine, the combination with a reciprocating piston; of means for supplying a gaseous mixture to the compression chamber at the commencement of the suction stroke of said piston; an inlet to the cylinder at a point in advance of the position of said piston at the commencement of the compression stroke; a combined reciprocating and revoluble valve for said inlet; rotatable means secured to and movable with said valve for regulating the amount of gas passing through said opening; means for reciprocating said valve at a predetermined time; and means controlled by the governor for rotating said gas regulating means.

9. In an internal combustion engine, the combination with a reciprocating piston; of means for supplying a gaseous mixture to the compression chamber at the commencement of the suction stroke of said piston; an inlet to the cylinder at a point in advance of the position of said piston at the commencement of the compression stroke; a combined reciprocating and revoluble valve for said inlet; means for reciprocating said valve at a predetermined time to open said valve; and means controlled by the governor for rotating said valve at a predetermined time to regulate the amount of gas passing through said valve opening.

10. In an internal combustion engine, the combination with a reciprocating piston; of means for supplying a gaseous mixture to the compression chamber at the commencement of the suction stroke of said piston; an inlet to the cylinder at a point in advance of the position of said piston at the commencement of the compression stroke; a combined reciprocating and revoluble valve; means for opening said valve at a predetermined time; a cup-shaped member secured to the stem of said valve and movable therewith, provided with peripheral openings near the top, while the wall is also provided with slots which co-act with ports in the valve casing;

and means for rotating said cup-shaped member to regulate the supply through said ports.

11. In an internal combustion engine, the combination with a reciprocating piston; of means for supplying a mixture of gaseous fuel and air under compression to the compression chamber at the commencement of the suction stroke of said piston; means for admitting an additional supply of air under a higher compression at a later period during the suction stroke; and a valve for regulating the admission of said additional supply.

12. In an internal combustion engine, the combination of means for varying the volume of the compression space; means for supplying and regulating the amount of combustible mixture under compression at the end of the explosion stroke; and means for regulating the volume of the compression space in relation to the amount of combustible mixture supplied.

13. In an internal combustion engine, the combination with a reciprocating piston; of means for supplying a gaseous mixture to the compression chamber at the commencement of the suction stroke of said piston; an inlet to the cylinder at a point in advance of the position of said piston at the commencement of the compression stroke; a combined reciprocating and revoluble valve for said inlet; means for reciprocating said valve at a predetermined time to open said valve; and adjustable means controlled by the governor for rotating said valve at a predetermined time to regulate the amount of gas passing through said valve opening.

14. In an internal combustion engine, the combination of means for varying the volume of the compression space; means for supplying a combustible mixture at greater than atmospheric pressure; and common means for regulating the volume of the compression space and the amount of combustible mixture admitted.

15. In an internal combustion engine of four-cycle type, means for admitting to the compression chamber thereof a combustion mixture at greater than atmospheric pressure; and means for varying the volume of the compression space simultaneously with the change in volume of combustible admitted.

16. In an internal combustion engine, the combination of means for supplying a combustible mixture under compression during the suction stroke; and means for automatically so regulating the amount of the combustible mixture admitted and the amount of compression produced during the compression stroke, that the compression will be inversely proportional to the amount of combustible mixture admitted.

17. In an internal combustion engine, the combination with a governor; of means for varying the volume of the compression space; means for supplying a combustible mixture under compression at the end of the explosion stroke; and means whereby the governor regulates the volume of the compression space and the amount of combustible mixture supplied.

18. In an internal combustion engine, the combination of means for supplying a combustible mixture under compression during the suction stroke; and means for regulating the pressure of the combustible mixture admitted and the amount of compression produced during the compression stroke.

Signed by me at 4 Post Office Sq., Boston, Mass., this 19th day of December, 1908.

OLIN A. STRANAHAN.

Witnesses:
WALTER E. LOMBARD,
NATHAN C. LOMBARD.